United States Patent [19]

Salt

[11] Patent Number: 4,880,305
[45] Date of Patent: Nov. 14, 1989

[54] LASER DIRECTION OF ARRIVAL DETECTOR

[75] Inventor: James W. A. Salt, Kanata, Canada

[73] Assignee: Her Majesty The Queen as Represented by the Minister of National Defence of Her Majesty's Canadian Government, Ottawa, Canada

[21] Appl. No.: 320,848

[22] Filed: Mar. 2, 1989

Related U.S. Application Data

[63] Continuation of Ser. No. 770,751, Aug. 29, 1985, abandoned.

[30] Foreign Application Priority Data

Dec. 3, 1984 [CA] Canada ................................. 461127

[51] Int. Cl.$^4$ .............................. G01C 1/00; H01J 5/16
[52] U.S. Cl. ....................................... 356/141; 250/227
[58] Field of Search ............... 356/141, 152, 138, 147; 250/227, 578

[56] References Cited

U.S. PATENT DOCUMENTS

| | | | |
|---|---|---|---|
| 4,200,787 | 4/1980 | Carson | 250/227 |
| 4,225,781 | 9/1980 | Hammons | 356/152 X |
| 4,380,391 | 4/1983 | Buser et al. | 250/227 X |
| 4,395,121 | 7/1983 | Nory et al. | 356/152 |
| 4,433,912 | 2/1984 | Schwartz | 356/152 X |
| 4,459,022 | 7/1984 | Morey | 356/152 |
| 4,625,108 | 11/1986 | Nestel et al. | 356/141 X |

Primary Examiner—Thomas H. Tarcza
Assistant Examiner—Linda J. Wallace
Attorney, Agent, or Firm—Cushman, Darby & Cushman

[57] ABSTRACT

It has been found that the light output of a fibre bundle is a light annulus with a diameter and intensity that vary with the angle of light incidence on the input end. The specification describes a detector using this phenomenon for determining the orientation of a laser beam arriving at the detector. The detector includes a fibre optic bundle with a polished input end disposed at a known orientation and a sensor at the opposite, output end of the bundle for measuring the deflection of the output beam from the output end axis. It is also possible to measure the intensity of the output. Preferably, five orthogonal bundles are employed to provide a wide range of coverage for the detector.

14 Claims, 2 Drawing Sheets

LASER DIRECTION OF ARRIVAL DETECTOR

This is a continuation of application Ser. No. 06/770,751, filed Aug. 29, 1985, which was abandoned upon the filing hereof.

FIELD OF THE INVENTION

The present invention relates to detectors for determining the presence of parallel radiation arriving at a receiving point distant from the source of the radiation, and more particularly to a detector that also determines the direction of arrival of the radiation.

BACKGROUND

Known detectors for the present purpose use rings of laser detectors with a baffle for restricting the viewing angle of each detector. Thus, the viewing space is broken-up into a discrete number of directions of arrival. This limits the angular resolution of the direction of arrival to the number of detectors. The resolution can be improved by increasing the number of detectors.

SUMMARY OF THE INVENTION

The present invention is based on the observation that when parallel radiation is incident on an input end face of a polished fibre bundle, the output end of the bundle emits a light annulus with a diameter and intensity that vary as functions of the angle of arrival or incidence of the input radiation.

Thus, according to the present invention, there is provided a detector for use in determining the orientation of a laser beam arriving at the detector, comprising: a fibre optic bundle with a polished input end disposed at a known orientation and an output end; and a sensor means adjacent the output end of the bundle for measuring a characteristic of a light output from the bundle that is representative of the angle of incidence of the laser beam on the input end.

In preferred embodiments, plural fibre bundles with non-parallel input face are employed, each with its own sensor. An appropriate arrangement is five bundles orthogonally arranged. A microprocessor is used in conjunction with the sensors to determine the direction of arrival of the laser beam from the outputs from the individual bundles.

BRIEF DESCRIPTION OF THE DRAWINGS

In the accompanying drawings which illustrate exemplary embodiments of the present invention and graphic representations of the fibre bundle characteristics.

DETAILED DESCRIPTION

Figure 1:
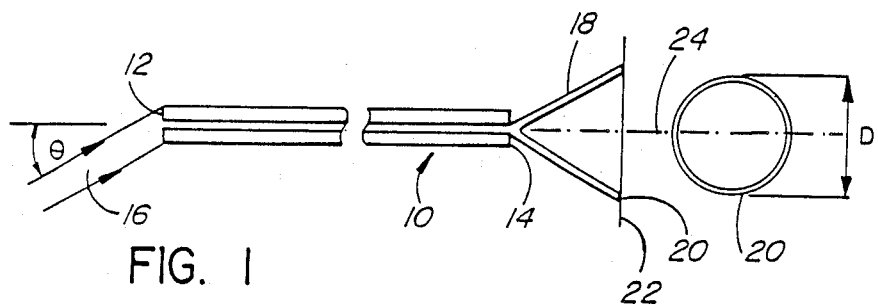
FIG. 1 is a schematic representation of an optical fibre bundle showing an exemplary input and output.

Referring to the drawings, and particularly to FIG. 1, a fibre optic bundle 10 has a polished input end face 12 and an output end face 14. An incoming laser beam 16 is incident on the input end face 12 of the fibre bundle 10 at an angle $\theta$, which is measured between the parallel radiation 16 and a line normal to the end face 12. The light transmitted through the fiber is emitted from the output end 14 in a conical beam 18 that describes an annulus 20 on an intercepting plane 22 normal to the axis 24 of the bundle 10 at the output end 14. The annulus 20 has a diameter D that can be recorded with an appropriate photodetector array or with a photographic recording medium at the plane 22.

Figure 2:
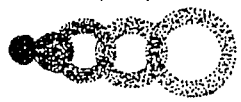
FIG. 2 is a record of output annulus diameters for various incidence angles of input radiation.
Figure 3:
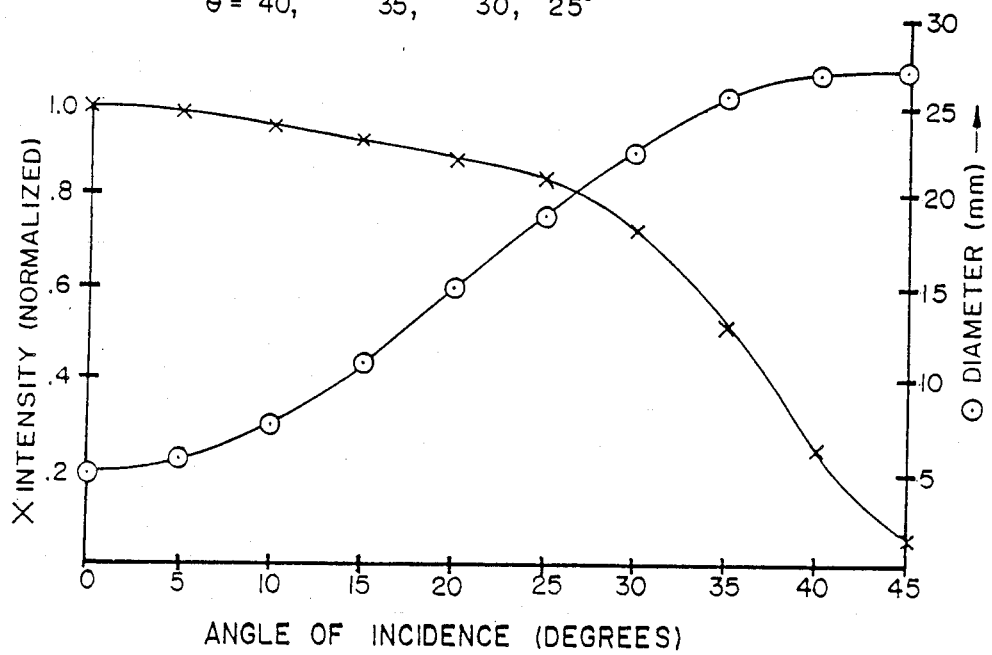
FIG. 3 is a chart of the output intensity and output diameter as a function of the input angle of incidence.

FIG. 2 illustrates annuli produced at various angles of incidence, indicating the increase in diameter and reduction in intensity that occurs with increasing angles of incidence. The intensity of transmission may also be recorded using an appropriate intensity meter to give a quantitative result. The intensity and diameter are plotted vs. angle of incidence in FIG. 3. It will be observed that the diameter increases with increased angle of incidence, while the intensity decreases. It is to be anticipated that the intensity characteristic will vary depending on the transmission efficiency level of the particular fiber bundle employed. This will require the individual calibration of any detector using intensity as a measured parameter representing the direction of arrival.

Figure 4:
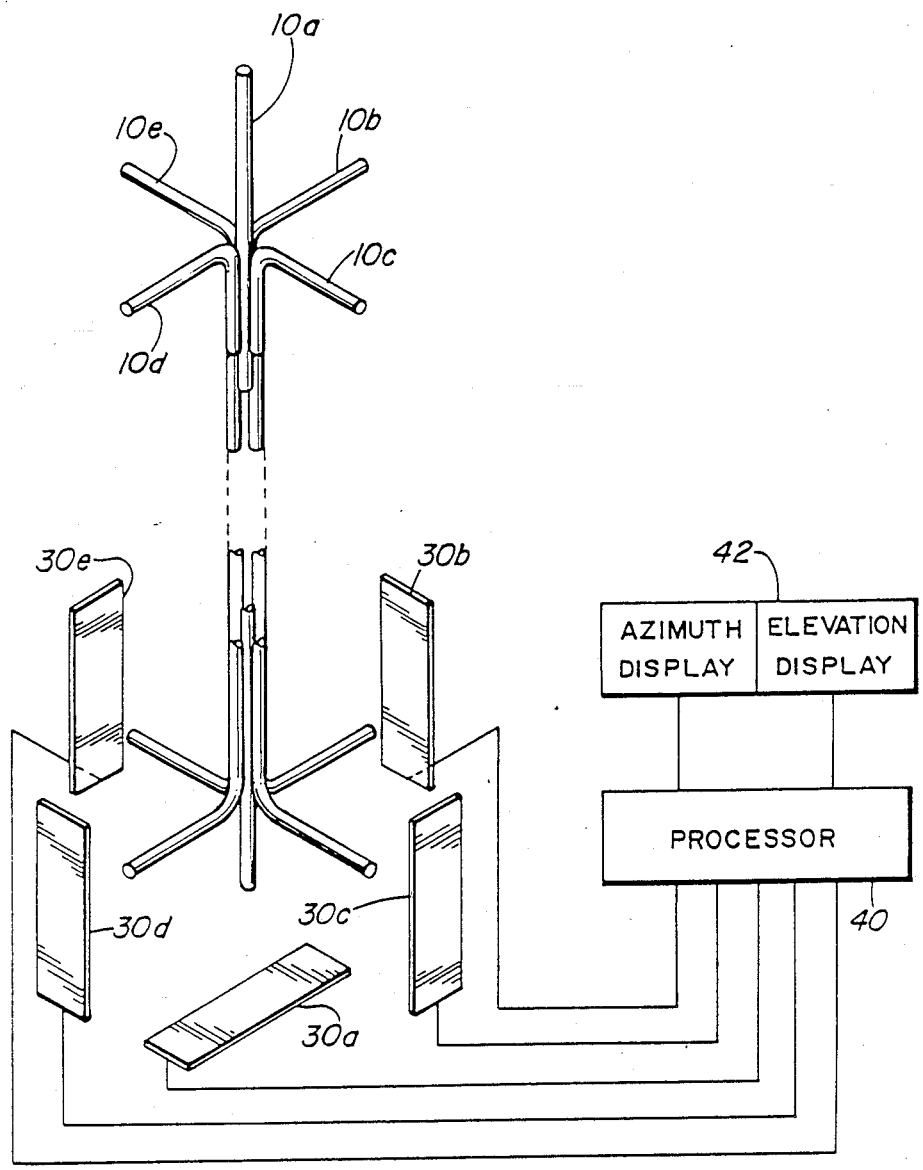
FIG. 4 is a schematic representation of a detector system using plural fibre bundles for displaying the azimuth and elevation of incoming radiation.

FIG. 4 illustrates a complete detector system for detecting and displaying the direction of arrival of a laser beam over a wide range of angles. The detector consists of five fiber bundles 10a through 10e with their input ends arranged in an orthogonal array. The output ends of the fiber bundles are associated with respective linear photodetector arrays 30a through 30e. Each array produces a signal representative of the diameter of the annulus emitted from the associated fiber bundle. This signal is supplied to a processor 40 which computes the angle of arrival using an appropriate algorithm and causes a display 42 to display the azimuth and elevation of the direction of arrival.

Where the detector is mobile, for example where it is mounted on a vehicle, it may be desirable to connect the processor 40 with a navigation system carried by the vehicle to provide absolute azimuth and elevation readings.

While FIG. 4 illustrates one particular embodiment of the detector system, it is to be understood that various modifications and changes can be made without departing from the concept of the invention. For example, the linear detector arrays 30a through 30e can readily be replaced with annular or spherical arrays to provide a more accurate indication of the direction of arrival and detect radiating of lower intensities due to the increased size of detector material exposed to the annulus.

The system may be robust due to the ruggedness of the fibers. It may be constructed with small size and weight. Because the detector is relatively simple and inexpensive, it can be employed in multiples at relatively low cost. The fibers are sensitive to a broad width and can be turned to various wavelengths with appropriate filters.

I claim:

1. A detector for use in determining the orientation of a laser beam arriving at the detector, comprising:
    a fibre optic bundle having a longitudinal axis with a polished input end disposed at a known orientation, and an output end; and
    sensor means adjacent the output end of the bundle for measuring a diameter of a light output from the bundle at a predetermined plane perpendicular to the longitudinal axis, which diameter varies as a function of the angle of the incidence of the laser beam on the input end.

2. The detector according to claim 1, wherein the sensor means is a photodetector array.

3. The detector according to claim 1, wherein the sensor means also measures an intensity of the light output.

4. The detector according to claim 1, wherein the sensor means measures a deflection of the output from an axis of the output end.

5. The detector according to claim 4, wherein the sensor means also measures an intensity of the light output.

6. The detector as in claim 1 further comprising processing means, connected to said sensor means, for determining a direction of arrival of said laser beam.

7. The detector as in claim 6 wherein said processing means includes means for determining said direction of arrival as a function of said diameter.

8. A detector for determining the orientation of a laser beam arriving at the detector, comprising:
 a plurality of fibre optic bundles with longitudinal axes and input ends arranged at known, non-parallel orientations, and respective output ends; and
 sensor means adjacent the output ends of the bundles for measuring a diameter of a light output of each bundle at a predetermined plane perpendicular to each longitudinal axis, which diameter varies as a function of the angle of incidence of the laser beam on the input end of the respective bundle.

9. The detector according to claim 8, wherein the sensor means also includes means for measuring the intensity of the light output from the output end of each fibre bundle.

10. The detector according to claim 8, wherein the sensor means comprise means for measuring a deflection of the light output from an axis of the output end of each fibre bundle.

11. The detector according to claim 10, wherein the sensor means comprises a photodetector array for generating signals representative of the outputs from the respective fibre bundles.

12. The detector according to claim 11, including processor means for computing a direction of arrival from the sensor means signals, and display means for displaying the direction of arrival.

13. The detector as in claim 8 further comprising processing means connected to said sensor means for determining a direction of arrival of said laser beam.

14. The detector as in claim 13 wherein said processing means includes means for determining said direction of arrival as a function of said diameter.

* * * * *